US006405567B1

(12) United States Patent
Loeb et al.

(10) Patent No.: US 6,405,567 B1
(45) Date of Patent: Jun. 18, 2002

(54) REDUCED DISPERSION OPTICAL WAVEGUIDE AND METHODS FOR FABRICATING THE SAME

(75) Inventors: Mitchell Levy Loeb, Durham; Samuel Elbert Wallace, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/498,827

(22) Filed: Feb. 4, 2000

Related U.S. Application Data

(62) Division of application No. 08/933,704, filed on Sep. 19, 1997, now Pat. No. 6,134,366.

(51) Int. Cl.[7] .............................................. C03B 37/023
(52) U.S. Cl. ............................. 65/415; 65/414; 65/399; 385/123
(58) Field of Search ........................... 65/399, 398, 397, 65/402, 413, 414, 417, 421, 435, 415; 385/123

(56) References Cited

U.S. PATENT DOCUMENTS

| | | | |
|---|---|---|---|
| 4,261,639 A | 4/1981 | Kogelnik et al. | 350/96.15 |
| 5,042,906 A | 8/1991 | Chesler et al. | 385/123 |
| 5,047,076 A | 9/1991 | Cognolato et al. | 65/3.12 |
| 5,110,335 A | 5/1992 | Miller et al. | 65/3.12 |
| 5,361,319 A | 11/1994 | Antos et al. | 385/123 |
| 5,430,817 A | 7/1995 | Vengsarkar | 385/37 |
| 5,495,548 A | 2/1996 | Bilodeau et al. | 385/123 |
| 5,526,459 A | 6/1996 | Tanaka et al. | 385/142 |
| 5,579,427 A | 11/1996 | Rusanov et al. | 385/124 |
| 6,109,065 A | * 8/2000 | Atkins et al. | 65/399 |
| 6,128,928 A | * 10/2000 | Antos et al. | 65/398 |
| 6,134,366 A | * 10/2000 | Loeb et al. | 385/123 |

OTHER PUBLICATIONS

A. Joseph Antos et al., "Design and Characterization of Dispersion Compensating Fiber Based on the $LP_{01}$ Mode," *Journal of Lightwave Technology,* vol. 12, No. 10, Oct. 1994, pp. 1739–1745.
Luc B. Jeunhomme, "Single–Mode Fiber Optics Principles and Applications," p. 111 and p. 116.
"Glass Materials, Fiber Fabrication, and Characterization Techniques," *Fiber Optics and Systems,* 1985, pp. 88–101.
"Fabrication Process of High Silica Fibers," *Optical Fibers: Materials and Fabricaiton,* Tokyo 1986, pp. 51–135.

* cited by examiner

Primary Examiner—Phan T. H. Palmer
(74) Attorney, Agent, or Firm—Kelly K. Kordzik; Winstead, Sechrest & Minick, P.C.

(57) ABSTRACT

A reduced dispersion optical waveguide and methods of fabricating the same are implemented. The optical waveguide may be fabricated in commercially practicable units without having to predetermine its length in a particular application. The reduced dispersion optical waveguide prevents optical pulse overlap in optical waveguide transmission systems operating over long distances or at high data rates.

3 Claims, 6 Drawing Sheets

REDUCED DISPERSION OPTICAL WAVEGUIDE AND METHODS FOR FABRICATING THE SAME

This is a division of application serial No. 08/933,704 filed Sep. 19, 1997 now U.S. Pat. No. 6,134,366.

TECHNICAL FIELD

The present invention related to the field of optical waveguides in general and in particular to a method and apparatus for reducing dispersion in optical waveguides.

BACKGROUND INFORMATION

Single mode optical waveguides (or optical fibers) are limited in bandwidth by dispersion. A pulse of given shape introduced into the input end of an optical waveguide will be spread as the pulse is transmitted along the length of the optical waveguide because of dispersion, the variation of wave phase velocity with wave frequency which is an inherent property of the materials comprising the guide as well as of guided modes themselves. For a particular waveguide with a given set of optical properties, the amount by which a pulse spreads is proportional to the length of the optical waveguide. Pulse spreading cannot be permitted to proceed to the point where adjacent optical pulses overlap. Thus, for a given pulse shape and optical waveguide, dispersion limits the length of the optical waveguide. Conversely, dispersion limits the pulse rate in an optical waveguide system having given optical waveguide properties and transmission distance.

Thus, there is a need in the art for optical waveguides and methods for fabricating them which reduce the amount of dispersion in an optical waveguide. Such dispersion-free optical waveguides would allow transmission of optical data signals over increased distances and at higher data rates relative to conventional optical waveguide systems which do not employ methods to reduce the dispersion in the optical waveguide. Moreover, there is a particular need in the art for an optical waveguide, and methods for fabricating them, having reduced dispersion and which do not require a predetermination of the length of the optical waveguide or its properties in order to properly compensate for the effects of dispersion.

SUMMARY OF THE INVENTION

The previously mentioned needs are satisfied by the present invention. The invention provides, in one embodiment, an optical waveguide that has zero or an otherwise inconsequentially small dispersion over a length of optical waveguide. In such a reduced dispersion optical waveguide, the length of the guide is not constrained by optical pulse spreading considerations. The present invention also includes methods for making such a reduced dispersion optical waveguide. The optical waveguide achieves such reduced dispersion by employing alternating regions of waveguide having positive and negative dispersion.

An optical waveguide composed of alternating regions having dispersion of opposite sign, has a small net dispersion. The dispersion in a particular region is compensated by the dispersion of opposite sign in the succeeding region. Thus, by fabricating an optical waveguide from a multiplicity of pairs of regions having such alternating sign of dispersion, the resulting optical waveguide has a net dispersion that is substantially reduced over a waveguide having a uniform dispersion, and which may be zero in an embodiment thereof. Moreover, it is a further advantage of the present invention that the reduced dispersion of the optical waveguide is obtained without having to first determine the overall length of the optical waveguide, or its dispersion properties.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth to provide a thorough understanding of the present invention. However, it will be obvious to those skilled in the art that the present invention may be practiced without such specific details.

Refer now to the drawings wherein depicted elements are not necessarily shown to scale and wherein like or similar elements are designated by the same reference numeral through the several views.

Figure 1:
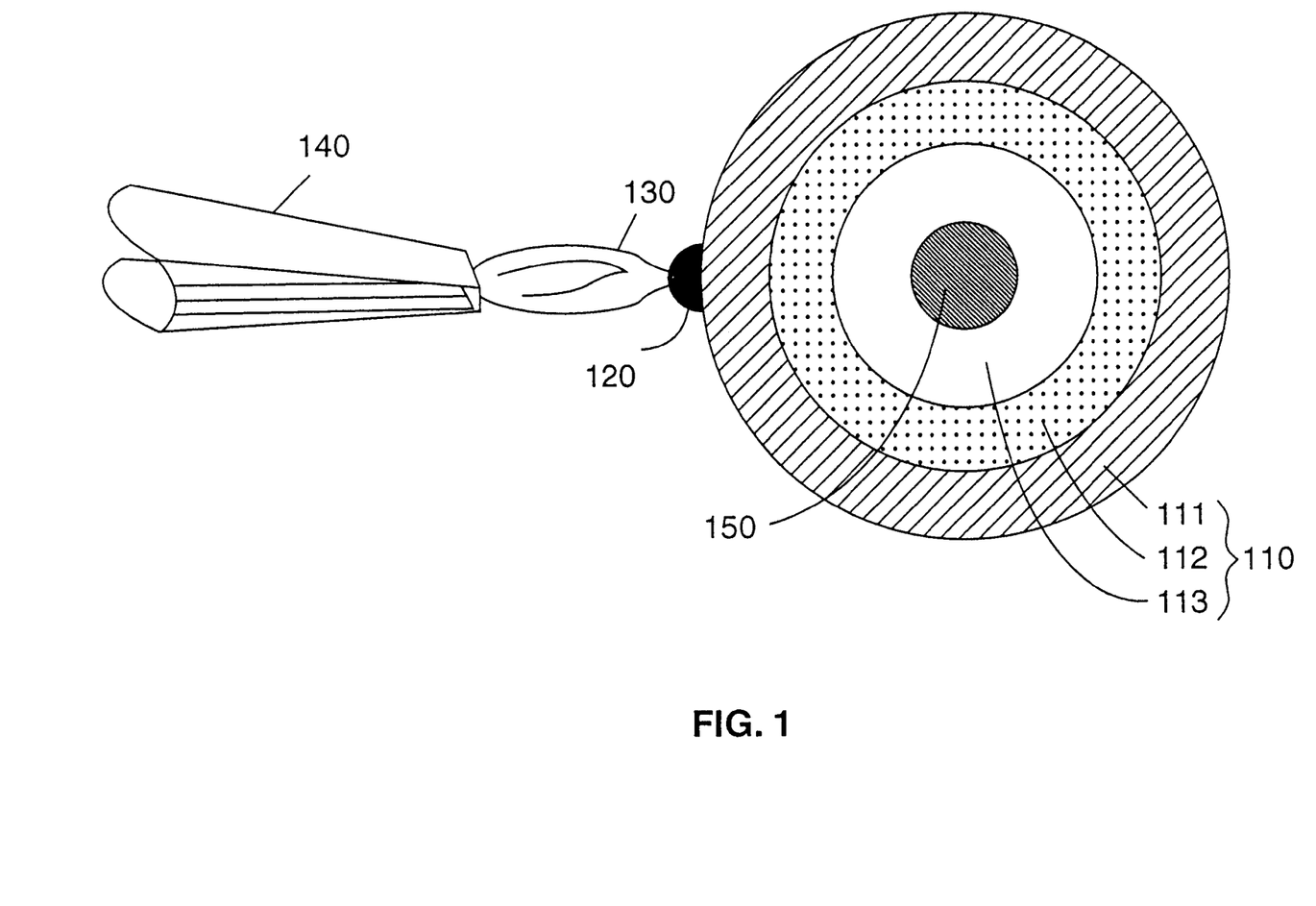
FIG. 1 schematically illustrates a method of fabrication in accordance with an embodiment of the present invention.

An invention that alleviates the problem of dispersion in optical waveguides will now be described in detail. Refer now to FIG. 1 in which is depicted a schematic representation of the fabrication of an optical waveguide perform 100 by the deposition of a soot 120 containing glass formers on a substrate 150. Glass formers may include, but are not limited to $SiO_2$ and $B_2O_3$. Glassy soot 120 is formed by flame pyrolysis by the action of flame 130 on a silica-containing reactant stream (not shown) provided to nozzle 140 along with a fuel stream (not shown) and an oxidizer stream (not shown). The fuel stream may be, but is not limited to methane. Glassy soot 120 may also incorporate dopants which affect dispersion properties of the resulting optical waveguide. It would be understood by an artisan of ordinary skill, that an embodiment having a preselected dispersion may have a concentration of dopants that varies across a transverse cross-section of the optical waveguide. It would be further understood by one of ordinary skill in the art that the preselected value of dispersion may be implemented by controlling the dopant concentration profile during deposition of soot layer 110 whereby a concomitant transverse profile of refractive index results.

In FIG. 1, soot layer 110 is illustrated as including an inner region 113 having a first preselected dopant concentration, a center region 112 having a second preselected dopant concentration, and an outer region 113 having a third preselected dopant concentration. It would be understood by an artisan of ordinary skill that other embodiments may have different transverse profiles of dopant concentration, and regions having different dopant concentration that are illustrated as changing abruptly across a transverse section may vary continuously in other embodiments of the present invention.

Following deposition of soot layer 110 on substrate 150, perform 100 is formed by consolidation of the soot layer 110. The formation of an optical waveguide perform by the deposition of a glassy soot layer formed by the flame pyrolysis of a reactant is common both to the prior art and to the present invention.

In an embodiment employing outside vapor deposition (OVD) substrate 150 may be a mandrel whereby the resulting perform 100 is a hollow, generally cylindrical, shell. An embodiment of an optical waveguide formed from perform 100 may be fabricated by the further steps of collapse of perform 100 and drawing a fiber therefrom. Moreover, it would be understood by one of ordinary skill in the art that the geometry in FIG. 1 is illustrative, and that other embodiments may take on other geometric forms, including plate-like forms.

In an embodiment employing vapor-phase axial deposition (VAD), substrate 150 may be a bait rod, whereby the resulting perform 100 is a solid, generally cylindrical, rod. Such an embodiment of an optical waveguide formed from perform 100 may be fabricated by the further step of drawing a fiber from perform 100.

The optical properties, including the dispersion, of an optical waveguide formed according to the methods of the prior art are uniform along the length of the optical waveguide. An embodiment fabricated according to the OVD method has a soot cylinder 110 that is built up by multiple passes of pyrolytic flame 130 over the length of substrate 150, which is simultaneously rotated. A preselected transverse profile of dopant concentration may be obtained by changing the concentration of dopant supplied in the feed stream (not shown) of pyrolytic flame 130 after a predetermined number of such passes. An artisan of ordinary skill would understand that an optical waveguide formed from the OVD process according to the prior art would have a constant dispersion along its length. In an embodiment fabricated using the VAD method, pyrolytic flame 130 is provided at an end of substrate 150. Substrate 150 is simultaneously rotated. A preselected transverse dopant profile may be obtained by controlling a structure of nozzle 140. Thus, the resulting soot layer 110, which is deposited at the end of substrate 150 and grows therefrom, is uniform along the length of substrate 150 in an embodiment fabricated according to the prior art.

Figure 2:
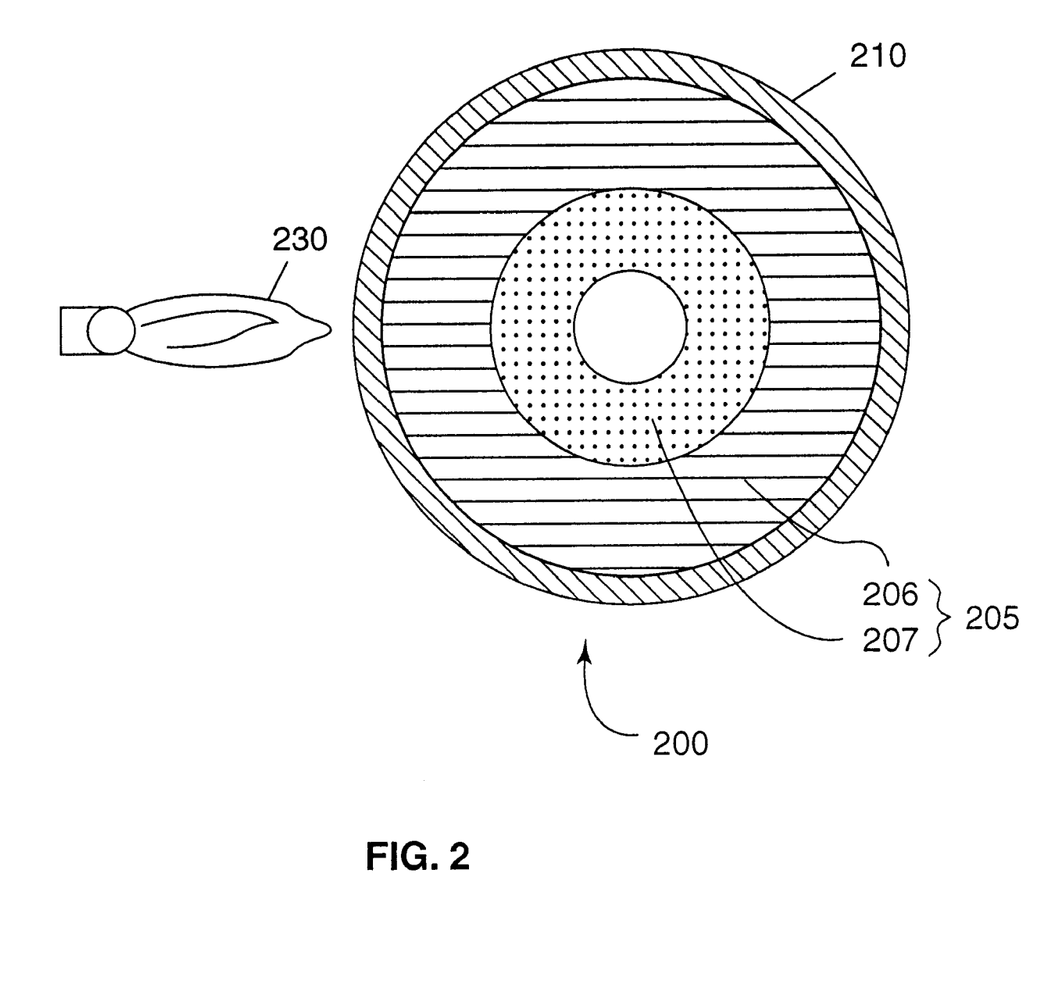
FIG. 2 schematically illustrates a method of fabrication in accordance with another embodiment of the present invention.

Similarly, referring now to FIG. 2, in an embodiment fabricated according to a modified chemical vapor deposition (MCVD) process, an axially uniform soot layer 205 is deposited on the interior surface of a generally cylindrical shell-like substrate 210. Soot layer 205 is built up through multiple passes of flame 230 over the length of substrate 210, which is simultaneously rotated. A feed stream (not shown) containing glass forming reactants is supplied to an interior of substrate 210. In the prior art, a constant dopant concentration is supplied in the feed stream (not shown) provided to the interior of substrate 210, over a multiplicity of passes of flame 230 along substrate 210. Soot layer 205 is illustrated as having an inner region 207 having a first preselected concentration of dopants and an outer region 206 having a second preselected dopant concentration. Soot layer 205, having predetermined dopant concentrations in each of inner region 207 and outer region 206, would be formed by changing the dopants introduced in the feed stream (not shown) supplied to the interior of substrate 210 after a preselected plurality of passes of flame 230 along substrate 210. Hence, the dispersion, which may be controlled by the transverse dopant concentration profile, that results is also constant along the length of the optical waveguide drawn from the perform 200 formed from soot layer 205 by the step of consolidation. In another embodiment, substrate 210 may be incorporated into perform 200. The dispersion also would be constant along the length of the optical waveguide in such an embodiment.

In an embodiment according to the prior art, the constant dispersion along the length of the optical waveguide gives rise to spreading of an optical pulse transmitted along the waveguide. The spreading is proportional to the length of the waveguide. This can give rise to an unacceptable overlap of optical pulses unless either the temporal spacing between pulses is sufficiently great, with a concomitant reduction in data rate, or the length of the optical waveguide is suitably restricted.

Figure 3:
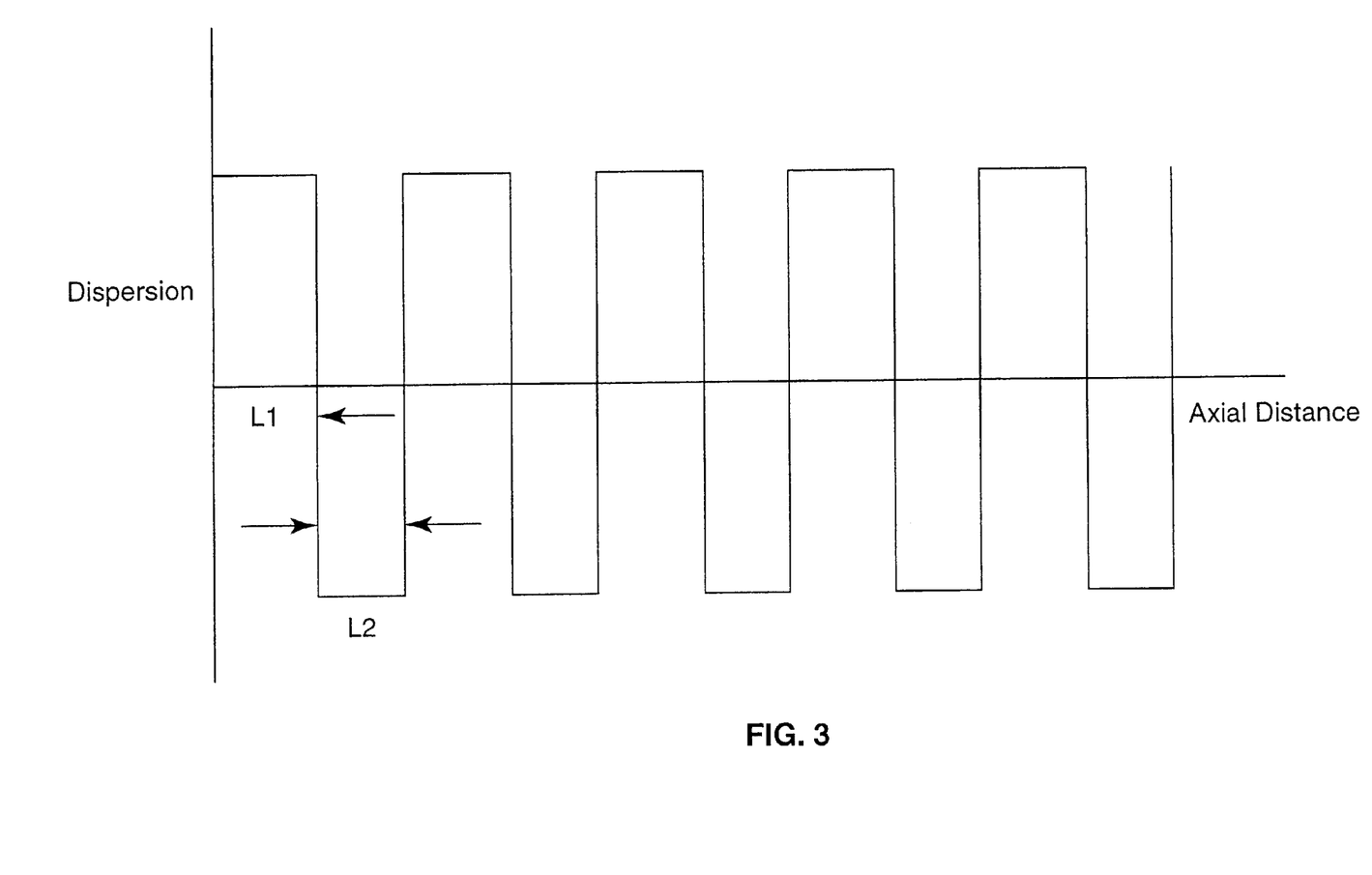
FIG. 3 is a schematic illustration of an axial dispersion profile in accordance with an embodiment of the present invention.

The present invention eliminates the effects of dispersion by tailoring the dispersive properties of the optical waveguide along its length. Refer now to FIG. 3 in which is depicted an illustrative axial dispersion profile of an optical waveguide of the present invention. In such an embodiment, the optical waveguide comprises alternating regions having dispersion of opposite algebraic sign. The length $L_1$ of those regions having a dispersion of predetermined algebraic sign is such that the spreading of an optical pulse during its passage through the region is just compensated by the pulse narrowing which results when the optical pulses pass through the succeeding region of length $L_2$ having dispersion of opposite algebraic sign. In this way an optical waveguide which has reduced dispersion results, as the effects of dispersion are compensated by the alternating regions of dispersion of opposite algebraic sign having preselected lengths, depending on the relative magnitudes of the positive dispersion and the negative dispersion, such that dispersive effects in the alternating regions offset each other.

In an embodiment of the present invention, regions of an optical waveguide having alternating positive and negative values of dispersion may be produced by changing the dopant concentration in the reactant feed stocks from which the soot layer, such as soot layer 110 of FIG. 1, is formed. In an embodiment formed by the OVD process according to the present invention, the dopant will be changed many times during a single pass of the flame along the length of a substrate, such as substrate 150 of FIG. 1. By changing the dopant according to a predetermined schedule during a single pass of the flame, such as pyrolytic flame 130 of FIG. 1, along a substrate, such as substrate 150 of FIG. 1, a soot layer, such as soot layer 110 of FIG. 1, having an axially alternating dopant concentration may be formed in an embodiment of the present invention. The dopant concentrations are preselected to produce dispersion characteristics of opposite algebraic sign in predetermined regions of an optical waveguide formed from a perform, such as perform 100 of FIG. 1. An embodiment of a reduced dispersion optical waveguide having dispersion properties as schematically depicted in FIG. 3 may be fabricated from such a perform. An OVD process fabricating an optical waveguide in the prior art would have constant dopant concentration during a single pass of a pyrolytic flame, such as pyrolytic flame 130 of FIG. 1, resulting in an optical waveguide having constant dispersion. The dopants similarly are changed in an embodiment according to the present invention fabricated by an MCVD process, such as in FIG. 2, where the dopants supplied to the feed stream (not shown) would change many times during a single pass of flame 230.

In an embodiment according to the present invention formed using the VAD process, the dopant will be changed after a particular length of soot layer, such as soot layer 110 of FIG. 1, has been deposited at an end of a substrate, such as substrate 150 of FIG. 1. In such an embodiment, the substrate may be a bait rod. The dopant concentrations are preselected to produce dispersion characteristics of opposite algebraic sign in predetermined regions of an optical waveguide formed from a perform, such as perform 100 of FIG. 1. In an embodiment of the present invention, the structure of nozzle 140 would accommodate different transverse dopant concentrations between the regions having positive dispersion and the regions having negative dispersion.

The relative lengths of the regions of positive dispersion and the regions of negative dispersion, such as are depicted schematically in FIG. 3, are preselected such that the pulse spreading in the regions of positive dispersion are cancelled in the regions of negative dispersion. An embodiment of the present invention may have a preselected length of the regions of positive dispersion, L, less than 1 kilometer, after drawing of the optical waveguide fiber, and a preselected length of the regions of negative dispersion, $L_2$, less than 1 kilometer, after drawing of the optical waveguide fiber.

Figure 4:
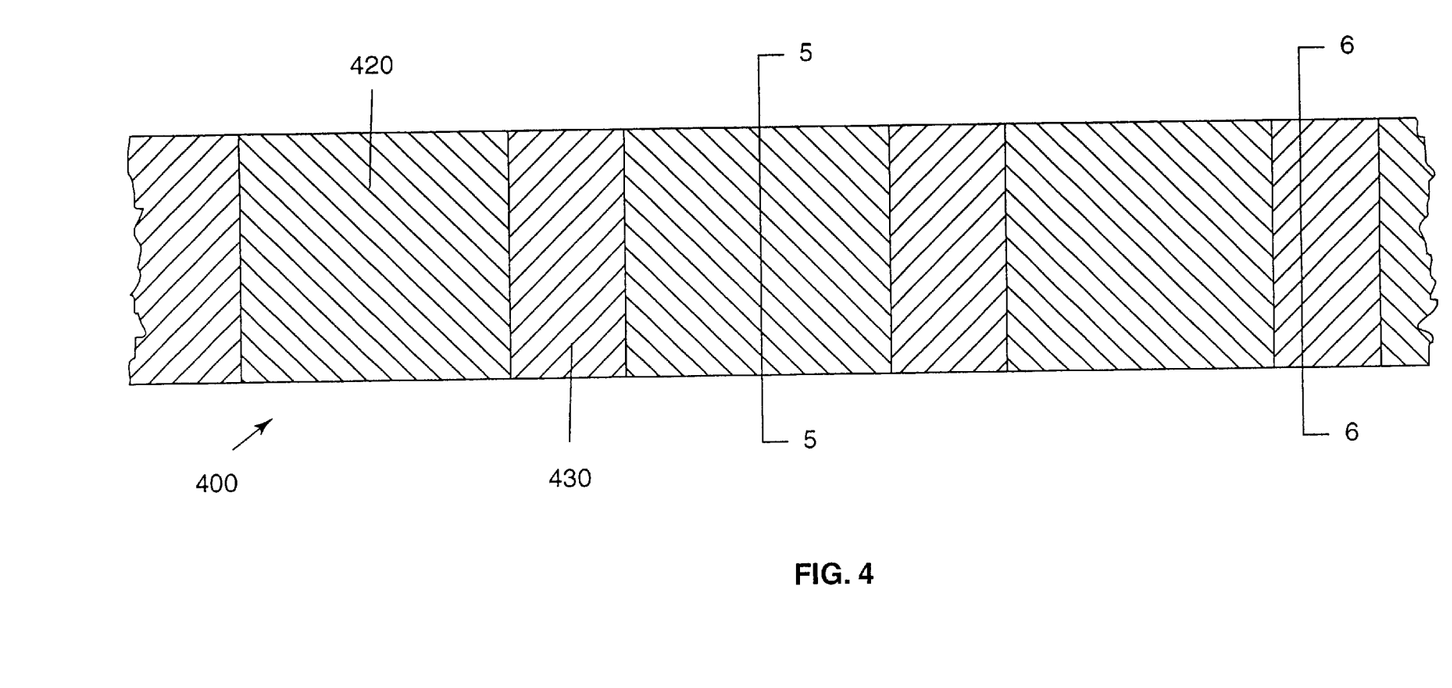
FIG. 4 illustrates an apparatus in accordance with an embodiment of the present invention.

The present invention may be further understood by referring now to FIG. 4 in which a portion of an optical waveguide 400 embodying the present invention is schematically depicted in longitudinal section. Transverse profiles of dopant concentration are not shown in FIG. 4. Optical waveguide 400 includes alternating regions of positive dispersion 420 and negative dispersion 430. Such an embodiment of the present invention may have an initial region having either positive dispersion or negative dispersion, provided only that a region having a given sign of the dispersion is succeeded by a region having the opposite sign of dispersion and regions alternate in sign thereafter, as hereinabove described, and the respective lengths of the regions of positive dispersion 420 and the regions of negative dispersion 430 are such that the spreading of an optical pulse in regions of positive dispersion 420 is completely or almost completely compensated in the regions having negative dispersion 430. Although optical waveguide 400 is illustrated as having regions of alternating algebraic sign of dispersion that changes abruptly between regions, another embodiment of the present invention may have an algebraic sign of dispersion varying continuously between regions.

Figure 5:
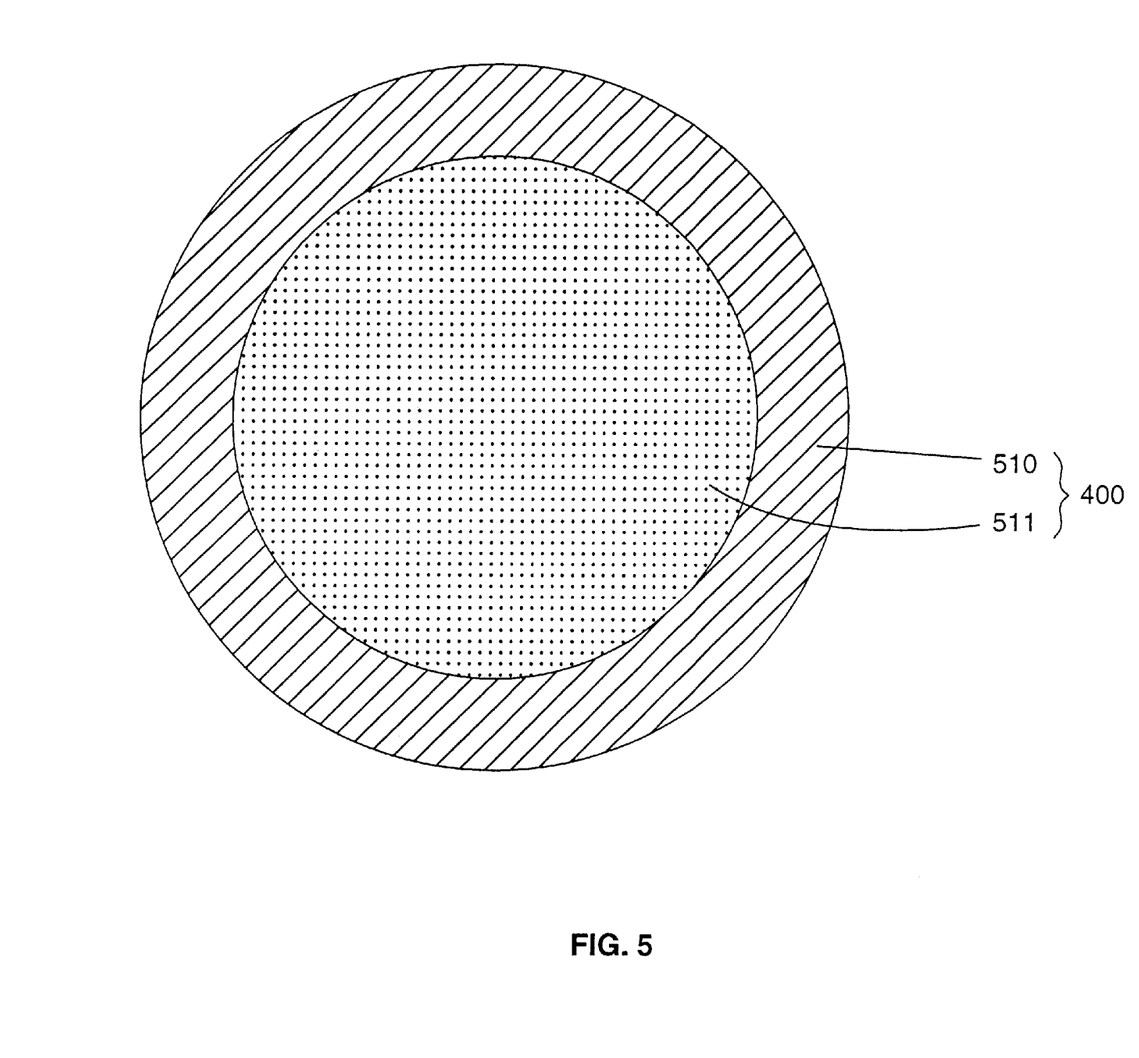
FIG. 5 illustrates a transverse section through a region of the embodiment of the present invention of FIG. 4.

The present invention may be further appreciated by considering transverse sections through an embodiment of optical waveguide 400. Refer now to FIG. 5 in which a transverse section of optical waveguide 400 through a region having positive dispersion in an embodiment of the present invention is shown. FIG. 5 illustrates a transverse dopant concentration profile in an embodiment including an inner "core" region 511 having a first dopant concentration and an outer "cladding" region 510 having a second dopant concentration. In another embodiment, one of inner region 511 and outer region 510 may be dopant-free. An embodiment having a dopant concentration of germanium in the inner region 511 and a dopant-free outer region 510 has positive dispersion. Another embodiment having a positive dispersion has a dopant-free inner region 511 and an outer region 510 containing a dopant concentration of fluorine. Although FIG. 5 illustrates a transverse dopant concentration profile having an abrupt transition between inner region 511 and outer region 510, an alternative embodiment of the present invention may have a transverse dopant concentration profile that varies continuously across a transverse section through a positive dispersion or region of optical waveguide 400.

Figure 6:
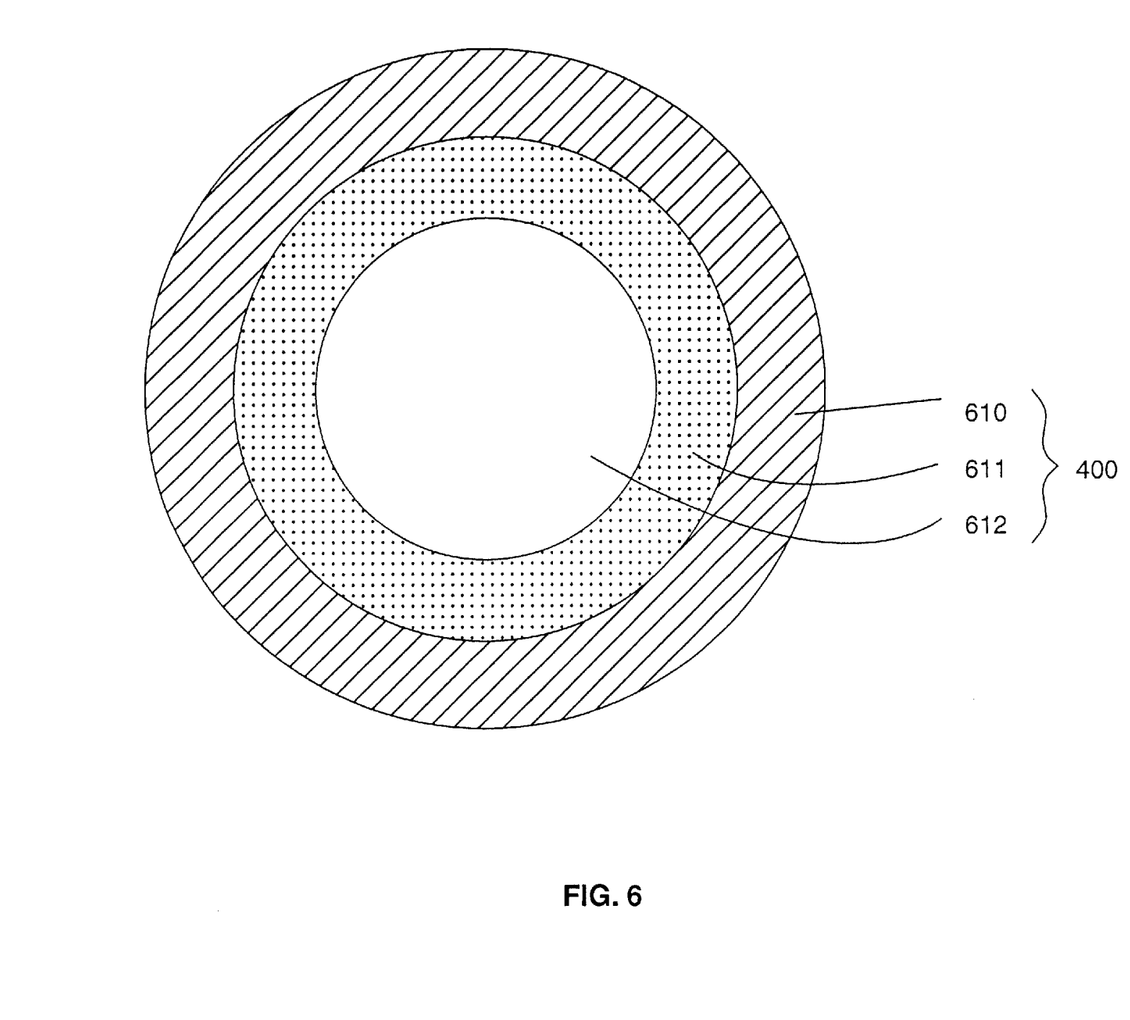
FIG. 6 illustrates a transverse section through another region of the embodiment of the present invention of FIG. 4.

Refer now to FIG. 6 in which a transverse section of waveguide 400 through a region having negative dispersion in an embodiment of the present invention is shown. FIG. 6 illustrates a transverse dopant concentration profile through a region having negative dispersion in an embodiment including an inner "core" region 612, a central region 611 and an outer "cladding" region 610. Inner region 612 has a first dopant concentration, central region 611 has a second dopant concentration, and outer region 610 has a third dopant concentration. One or more of the inner 612, central 611 and outer 610 regions may be dopant-free in another embodiment. An embodiment having a dopant concentration of germanium in the inner region 612, a dopant concentration of fluorine in central region 611 and a dopant-free outer region 610 has negative dispersion for a predetermined set of wavelengths. Although FIG. 6 illustrates a transverse dopant concentration profile having an abrupt transition between inner region 612 and central region 611 and between central region 611 and outer region 610, an alternative embodiment of the present invention may have a concentration profile that varies continuously across a transverse section through a negative dispersion region of optical waveguide 400.

An optical waveguide, such as optical waveguide 400 of FIG. 4, embodying the present invention may be fabricated in commercially practicable bulk quantities from which a specific length of optical waveguide required in a particular application may be cut. In the present invention so embodied, preselected lengths $L_1$, and $L_2$ of the positive dispersion region 420 and the negative dispersion regions 430 are such that any uncompensated portion remaining at the end of a length of waveguide employed in a particular application are such that any residual dispersion arising therefrom is inconsequential.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A method of forming an optical waveguide comprising the steps of providing a substrate;

depositing a glassy soot along a length of said substrate, said glassy soot containing one or more dopants, said one or more dopants having a concentrate ion varying along said length of said substrate, whereby a dispersion of a reduced dispersion optical waveguide has an algebraic sign controlled by said concentration of said dopants.

2. The method of forming an optical waveguide of claim 1 wherein said step of depositing said glassy soot containing one or more dopants, said one or more dopants having a concentration varying along said length of said substrate material further comprises the steps of:

providing a dopant feed stream having a variable dopant concentration of one or more dopants; and passing a flame back and forth along said length of said substrate a plurality of times, said variable dopant concentration of one or more dopants being changed a plurality of times during each pass of said flame.

3. The method of forming an optical waveguide of claim 1 wherein said step of depositing said glassy soot containing one or more dopants, said one or more dopants having a concentration varying along said length of said substrate material further comprises the steps of:

providing a flame proximal to an end of said substrate; and providing a concentration of one or more dopants to said flame wherein said concentration of said one or more dopants further comprises a first predetermined concentration of said one or more dopants during a first preselected set of intervals of time, whereby a first preselected set of regions along said length of said substrate is grown, and a second predetermined concentration of said one or more dopants during a second preselected set of intervals of time, whereby a second preselected set of regions along said length of said substrate is grown.

* * * * *